(12) United States Patent
Chiba et al.

(10) Patent No.: US 11,705,609 B2
(45) Date of Patent: Jul. 18, 2023

(54) CONTACT STRUCTURE

(71) Applicant: JVCKENWOOD Corporation, Yokohama (JP)

(72) Inventors: Koji Chiba, Yokohama (JP); Takashi Kuboki, Yokohama (JP); Takeshi Kimura, Yokohama (JP); Kenji Tanisho, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 258 days.

(21) Appl. No.: 17/151,521

(22) Filed: Jan. 18, 2021

(65) Prior Publication Data

US 2021/0273304 A1 Sep. 2, 2021

(30) Foreign Application Priority Data

Feb. 28, 2020 (JP) ................................ 2020-033300

(51) Int. Cl.
  *H01M 50/543* (2021.01)
  *H01M 10/44* (2006.01)
  *H01M 50/296* (2021.01)
  *H02J 7/00* (2006.01)

(52) U.S. Cl.
  CPC ......... *H01M 50/543* (2021.01); *H01M 10/44* (2013.01); *H01M 50/296* (2021.01); *H02J 7/0045* (2013.01)

(58) Field of Classification Search
  CPC .. H01M 50/543; H01M 10/46; H01M 50/552; H01M 50/296; Y10S 439/929; H01R 13/24
  See application file for complete search history.

(56) References Cited

U.S. PATENT DOCUMENTS 4,710,134 A * 12/1987 Korsunsky ........... H05K 7/1007
  439/70
5,518,424 A *  5/1996 Douty ................. H01M 50/213
  439/500

(Continued)

FOREIGN PATENT DOCUMENTS

JP    11185827 A  *  7/1999
JP  2006034066 A  *  2/2006
JP     3124613 U     8/2006

*Primary Examiner* — Richard Isla
*Assistant Examiner* — Sadia Kousar
(74) *Attorney, Agent, or Firm* — Nath, Goldberg & Meyer; Jerald L. Meyer (57) ABSTRACT

A contact structure causing a first electric device to be electrically connected to a second electric device includes first terminals and second terminals. The second terminals include contact projections to be electrically connected to the first terminals, and cleaning projections located closer to an opening side of a fitting part of the second electric device than the contact projections to be brought into contact with the first terminals. The contact structure is configured such that the contact projections are not in contact with a surface of an outer case of the first electric device or surfaces of the first terminals before the cleaning projections climb over the first terminals. The contact structure is also configured such that the contact projections are brought into contact with the surfaces of the first terminals after the cleaning projections climb over the first terminals.

5 Claims, 9 Drawing Sheets

(56) References Cited

U.S. PATENT DOCUMENTS

| | | | |
|---|---|---|---|
| 8,242,744 B2 * | 8/2012 | Matsuoka | H02J 7/0034 320/112 |
| 2012/0098494 A1 * | 4/2012 | Ogura | H02J 7/0045 320/112 |

* cited by examiner

CONTACT STRUCTURE

CROSS REFERENCE TO RELATED APPLICATION

This application is based upon and claims the benefit of priority under 35 U.S.C. § 119 from Japanese Patent Application No. 2020-033300 filed on Feb. 28, 2020, the entire contents of which are incorporated herein by reference.

BACKGROUND

The present disclosure relates to a contact structure causing a first electric device to be electrically connected to a second electric device in a state in which the first electric device is fitted to a recessed fitting part of the second electric device.

A typical contact structure causing a first electric device such as a battery to be electrically connected to a second electric device such as a battery charger includes first terminals provided on an outer case of the first electric device, and second terminals provided on an inner wall of a fitting part of the second electric device to be brought into contact with the surfaces of the first terminals. The second terminals include projections projecting inward in the fitting part of the second electric device. The projections serve as contact points to be electrically connected to the first terminals, and further have a function of cleaning the first terminals and the second terminals.

The contact structure can scrape out dirt such as stains or dust adhering to the surfaces of the first terminals by rubbing between the projections of the second terminals and the surfaces of the first terminals upon the fitting of the first electric device to the fitting part of the second electric device. This enables the first electric device and the second electric device to be electrically connected to each other with the first terminals and the like cleaned, so as to reduce a contact failure (a connection failure) between the first electric device and the second electric device.

Japanese Utility Model Registration No. 3124613 is one of the related art.

Dirt scraped by the rubbing between the projections of the second terminals and the surfaces of the first terminals in the contact structure is sometimes gathered around the projections of the second terminals. The cleaning by the rubbing may cause a contact failure between the first electric device and the second electric device.

The contact structure disclosed in Japanese Utility Model Registration No. 3124613 includes elastic pieces having cleaning projections for cleaning the first terminals, in addition to the second terminals having the projections on the inner wall of the fitting part of the second electric device. The cleaning projections are located closer to the opening side of the fitting part of the second electric device than the projections of the second terminals, and project in the inward direction of the fitting part of the second electric device. The cleaning projections can scrape out the dirt adhering to the surfaces of the first terminals by the rubbing between the cleaning projections of the elastic pieces and the surfaces of the first terminals before the projections of the second terminals are brought into contact with the surfaces of the first terminals. The contact structure thus can reduce the dirt to be scraped by the rubbing between the projections of the second terminals and the surfaces of the first terminals, so as to avoid or reduce a contact failure between the first electric device and the second electric device caused by the cleaning accordingly.

The contact structure disclosed in Japanese Utility Model Registration No. 3124613, however, may cause the dirt to adhere to the projections of the second terminals due to the contact of the projections with the surface of an outer case (a first outer case) of the first electric device upon the fitting of the first electric device to the fitting part of the second electric device. The dirt, if adhering, may cause a contact failure between the first electric device and the second electric device because of the contact between the projections of the second terminals and the outer case of the first electric device.

SUMMARY

One or more embodiments provide a contact structure capable of sufficiently reducing a rate of occurrence of a contact failure between a first electric device and a second contact device.

An aspect of one or more embodiments provides a contact structure (a terminal structure) causing a first electric device to be electrically connected to a second electric device in a state in which the first electric device is fitted to a recessed fitting part of the second electric device, the contact structure including a first terminal provided at an outer case of the first electric device, and a second terminal provided on an inner wall of the fitting part of the second electric device to be electrically brought into contact with a surface of the first terminal. The second terminal includes a contact projection projecting in an inward direction of the fitting part of the second electric device to be brought into contact with the surface of the first terminal, and a cleaning projection located closer to an opening side of the fitting part of the second electric device than the contact projection and projecting in the inward direction to be brought into contact with the first terminal. The contact structure is configured such that the contact projection is not in contact with a surface of the outer case of the first electric device or the surface of the first terminal before the cleaning projection climbs over the first terminal in response to a movement of the first electric device in a fitting direction relative to the second electric device. The contact structure is also configured such that the contact projection is brought into contact with the surface of the first terminal after the cleaning projection climbs over the first terminal.

Another aspect of one or more embodiments provides a contact structure (a terminal structure) causing a first electric device to be electrically connected to a second electric device in a state in which the first electric device is fitted to a recessed fitting part of the second electric device, the contact structure including a first terminal provided at an outer case of the first electric device, and a second terminal provided on an inner wall of the fitting part of the second electric device to be brought into contact with a surface of the first terminal. The second terminal includes a contact projection projecting in an inward direction of the fitting part of the second electric device to be brought into contact with the surface of the first terminal, and a cleaning projection located closer to an opening side of the fitting part of the second electric device than the contact projection and projecting in the inward direction to be electrically brought into contact with the first terminal. The contact structure is configured such that the contact projection is not in contact with a surface of the outer case of the first electric device or the surface of the first terminal in a state in which the cleaning projection is in contact with either the surface of the outer case of the first electric device or the surface of the first terminal. The contact structure is also configured such that the contact projection is brought into contact with the surface of the first terminal when the cleaning projection is shifted from the contact state to a non-contact state in response to a movement of the first electric device in a fitting direction relative to the second electric device.

DETAILED DESCRIPTION

Hereinafter, one or more embodiments are described with reference to the drawings from FIG. 1 to FIG. 5C.

As used in the specification and the claims according to the present disclosure, the term "fitting direction" refers to a direction in which a first electric device is fitted to a recessed fitting part of a second electric device. The term "inward direction of the fitting part" refers to a direction of approaching the middle of the fitting part. The term "outward direction of the fitting part" refers to a direction separating from the middle of the fitting part, which is opposite to the inward direction of the fitting part of the second electric device. In the drawings, a sign "FF" indicates a forward direction, a sign "FR" indicates a rearward direction, a sign "L" indicates a leftward direction, a sign "R" indicates a rightward direction, a sign "U" indicates an upward direction, and a sign "D" indicates a downward direction.

As illustrated in FIG. 1 to FIG. 4B, a contact structure 10 according to an embodiment is a structure causing a battery 12 as a first electric device to be electrically connected to a battery charger 14 as a second electric device in a state in which the battery 12 is fitted to a recessed fitting part 16 of the battery charger 14. Before explaining a specific configuration of the contact structure 10, configurations regarding the battery 12 and the battery charger 14 other than the configuration of the contact structure 10 are briefly descried below.

The battery 12 is an electric device removably attached to a main body of a wireless mobile device (not illustrated), and is an example of the first electric device as described above. The battery 12 includes a battery outer case (a battery casing) 18 as a first outer case extending in the upper-lower direction. The battery outer case 18 is formed of synthetic resin, for example. A secondary battery such as a lithium ion secondary battery (not illustrated) is installed in the battery outer case 18. The battery outer case 18 is provided inside with a thermistor (not illustrated) and a distinction resistor (not illustrated). The battery outer case 18 is also provided on the tip side with engagement grooves 20 extending in the longitudinal direction of the battery outer case 18 on both side surfaces in the short-side direction.

The battery charger 14 is an electric device for charging the battery 12, and is an example of the second electric device as described above. The battery charger 14 includes a casing-shaped battery-charger outer case (a battery-charger casing) 22 as a second outer case. The battery-charger outer case 22 is formed of synthetic resin, for example. The battery-charger outer case 22 includes a rectangular bottom plate 24, and a cover case 26 located on the upper side of the bottom plate 24. The cover case 26 is provided in the middle with the recessed fitting part 16 described above. The fitting part 16 has a substantially rectangular shape in a plan view.

The battery-charger outer case 22 is provided inside with a circuit board 28. A charge control circuit (not illustrated) for charging the battery 12 is mounted on the circuit board 28. The battery-charger outer case 22 is also provided with an input connector 30 at an appropriate position on the rear side of the battery-charger outer case 22. The input connector 30 is connected with a power supply cable (not illustrated) of an AC adaptor (not illustrated). DC power is supplied to the battery charger 14 via the AC adaptor. To place the battery 12 at a predetermined position in the fitting part 16 of the battery charger 14, engagement guides 32 to be engaged with the engagement grooves 20 of the battery outer case 18 are provided on the inner wall on the right and left sides of the fitting part 16 of the battery charger 14 (the cover case 26). The respective engagement guides 32 extend in the upper-lower direction.

The specific configuration of the contact structure 10 according to the present embodiment is described below.

Figure 1:
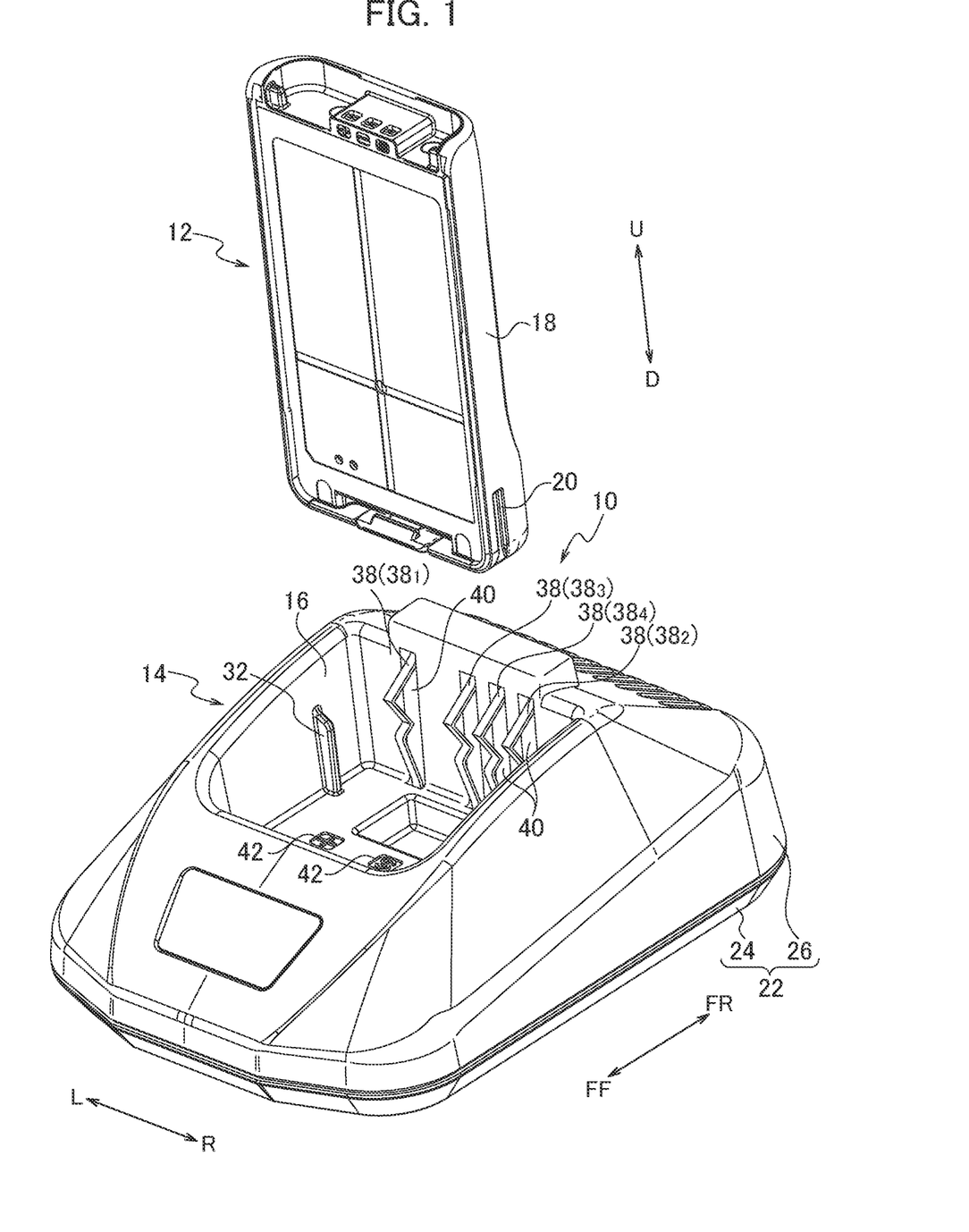
FIG. 1 is a front perspective view showing a battery and a battery charger as targets to be connected to each other in a contact structure according to one or more embodiments.
Figure 2:
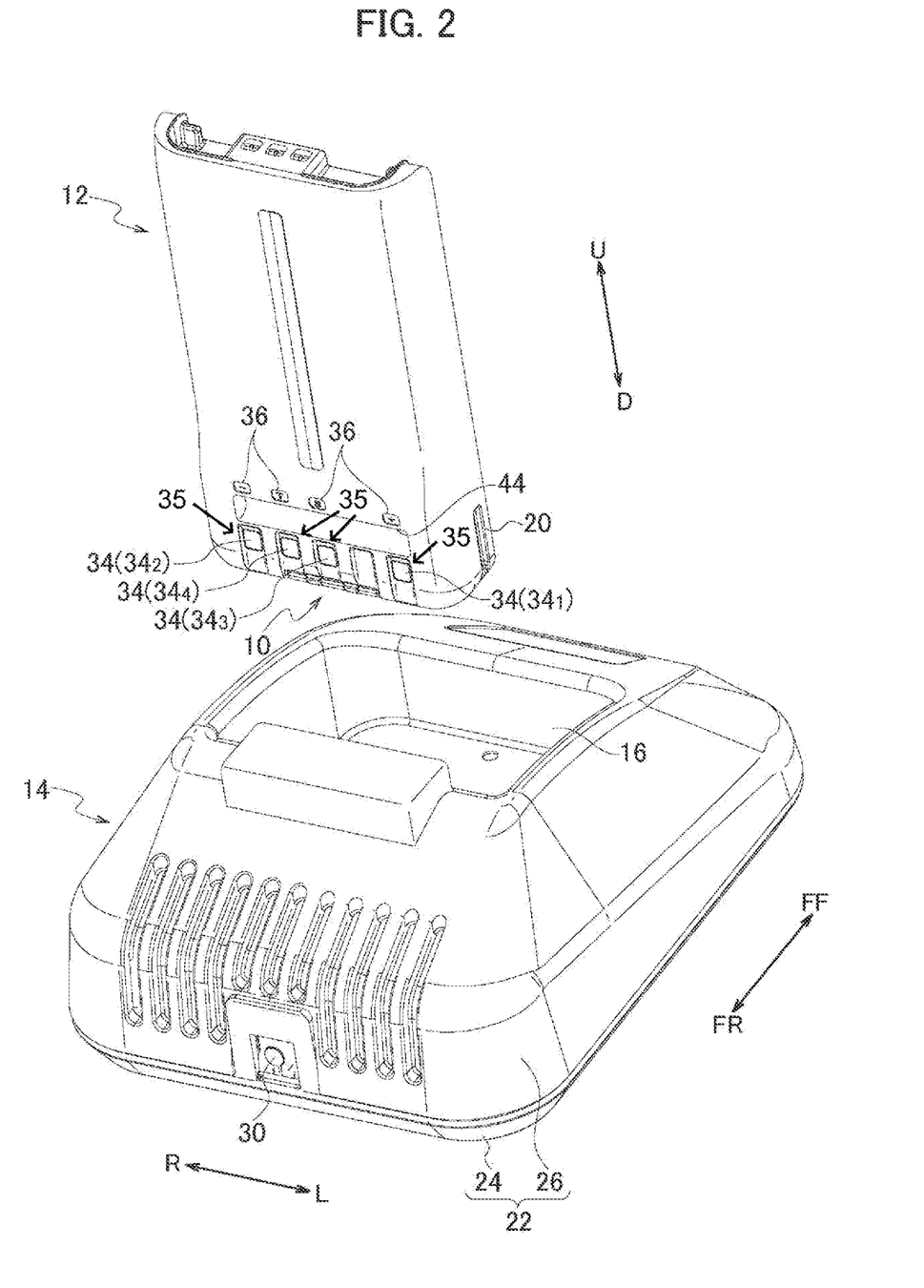
FIG. 2 is a rear perspective view showing the battery and the battery charger as targets to be connected to each other in the contact structure according to one or more embodiments.
Figure 3A:
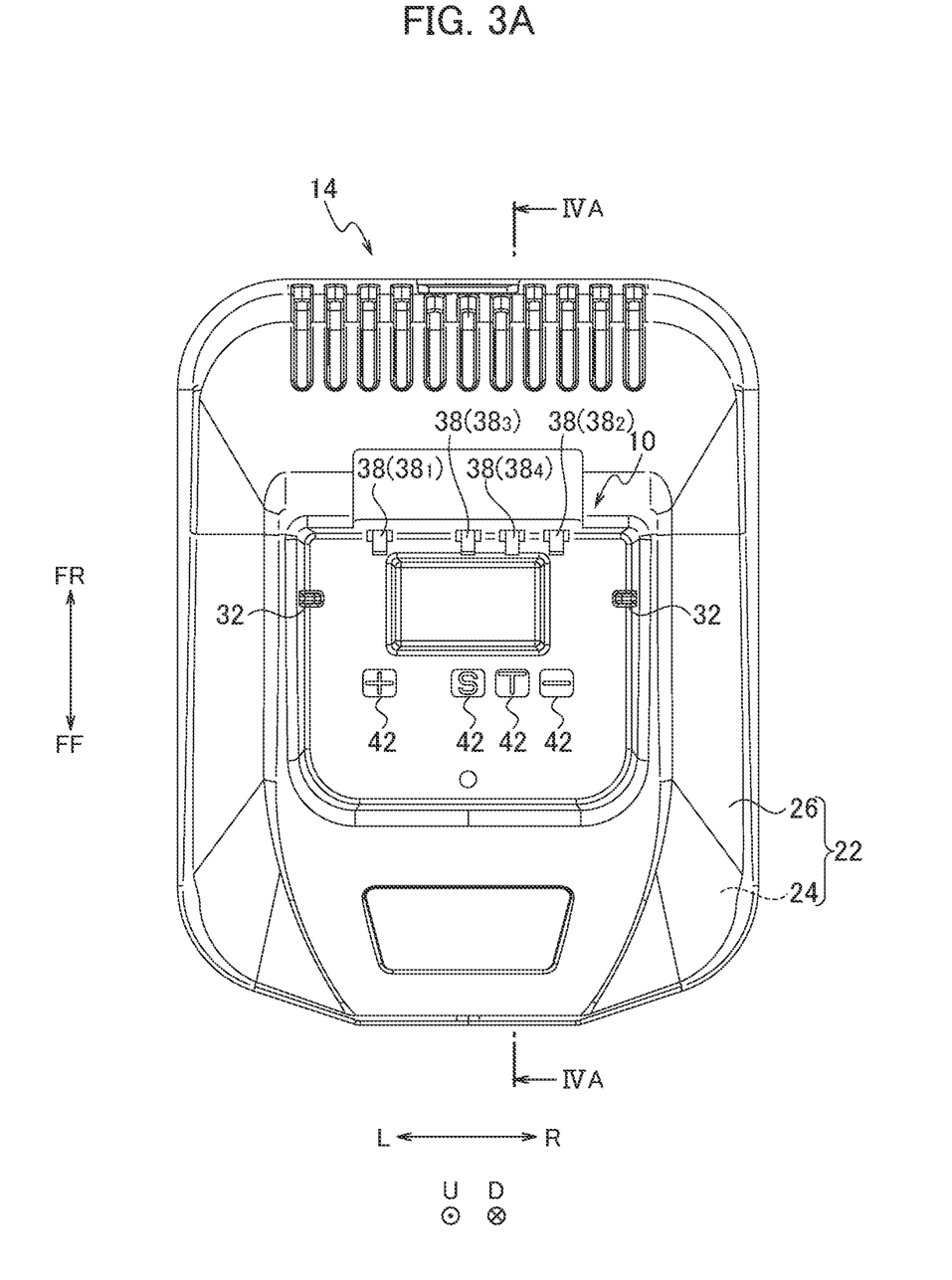
FIG. 3A is a plan view showing the battery charger including a part of the contact structure according to one or more embodiments.
Figure 3B:
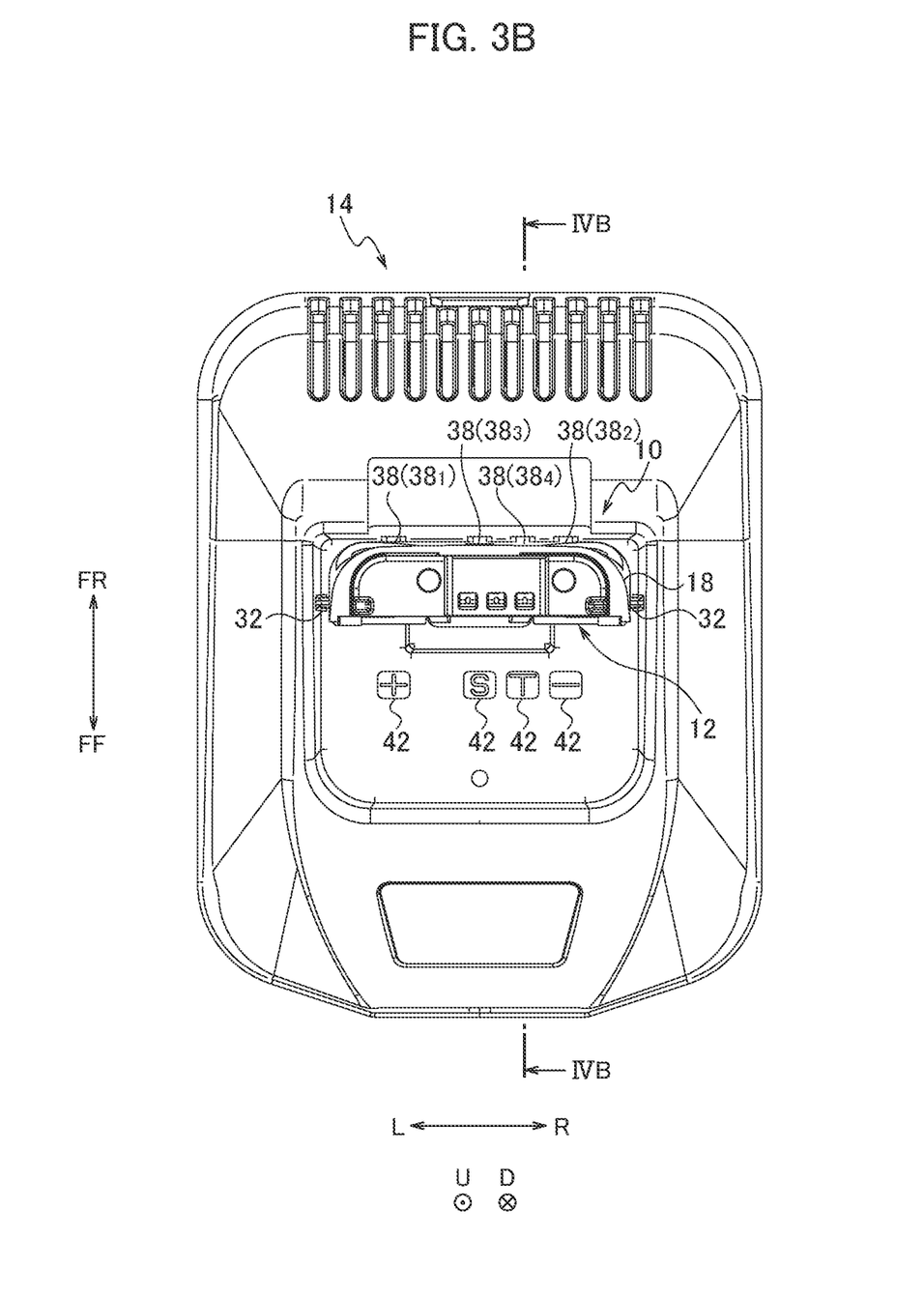
FIG. 3B is a plan view showing a state in which the battery is fitted to a fitting part of the battery charger.

As illustrated in FIG. 1 to FIG. 4B, the battery outer case 18 is provided at the bottom edge with a plurality of (four) battery terminals 34 as first terminals arranged at intervals in the short-side direction. As seen in FIG. 2 and FIG. 5A, for example, the battery terminals 34 are each a flat metallic piece and recessed on the surface of the battery outer case 18 within corresponding recesses 35. The four battery terminals 34 are a positive electrode terminal $34_1$, a negative electrode terminal $34_2$, an S-terminal as a battery distinction terminal $34_3$, and a T-terminal as a temperature detection terminal $34_4$. The positive electrode terminal $34_1$ is connected to a positive electrode of the secondary battery, and the negative electrode terminal $34_2$ is connected to a negative electrode of the secondary battery. The S-terminal $34_3$ is connected to the distinction resistor, and the T-terminal $34_4$ is connected to the thermistor. The surface of the battery outer case 18 adjacent to the respective battery terminals 34 is provided with indication marks 36 indicating the type of the respective battery terminals 34.

The circuit board 28 is provided with a plurality of (four) charging terminals 38 as second terminals mounted at intervals in the right-left direction to be brought into contact with the plural battery terminals 34. The respective charging terminals 38 project in the inward direction of the fitting part 16 of the battery charger 14 through slots 40 provided on the inner wall on the rear side of the fitting part 16 of the battery charger 14. The four charging terminals 38 as the second terminals are arranged at intervals in the right-left direction on the inner wall on the rear side of the fitting part 16 of the battery charger 14. The four charging terminals 38 are a positive electrode terminal $38_1$, a negative electrode terminal $38_2$, an S-terminal $38_3$, and a T-terminal $38_4$. The positive terminal $38_1$ is connected to the charge control circuit, and is to be brought into contact with the surface of the positive electrode terminal $34_1$ of the battery 12. The negative electrode terminal $38_2$ is connected to a ground potential, and is to be brought into contact with the surface of the negative electrode terminal $34_2$ of the battery 12. The S-terminal $38_3$ is to be brought into contact with the surface of the S-terminal $34_3$ of the battery 12, and the T-terminal $38_4$ is to be brought into contact with the surface of the T-terminal $34_4$ of the battery 12. The bottom surface of the fitting part 16 of the battery charger 14 adjacent to the respective charging terminals 38 is provided with indication marks 42 indicating the type of the respective charging terminals 38.

Figure 4A:
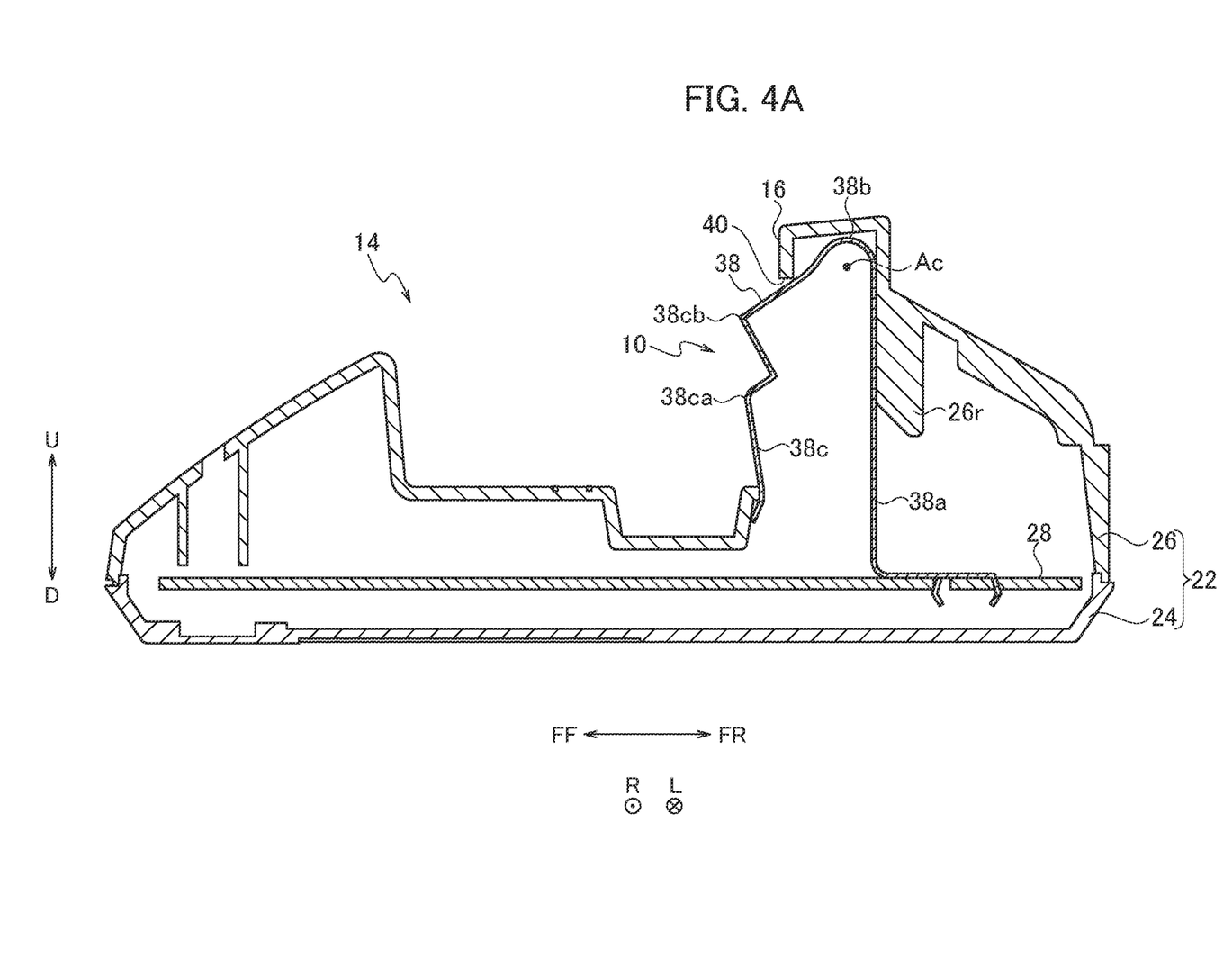
FIG. 4A is a cross-sectional view taken along line IVA-IVA in FIG. 3A.
Figure 4B:
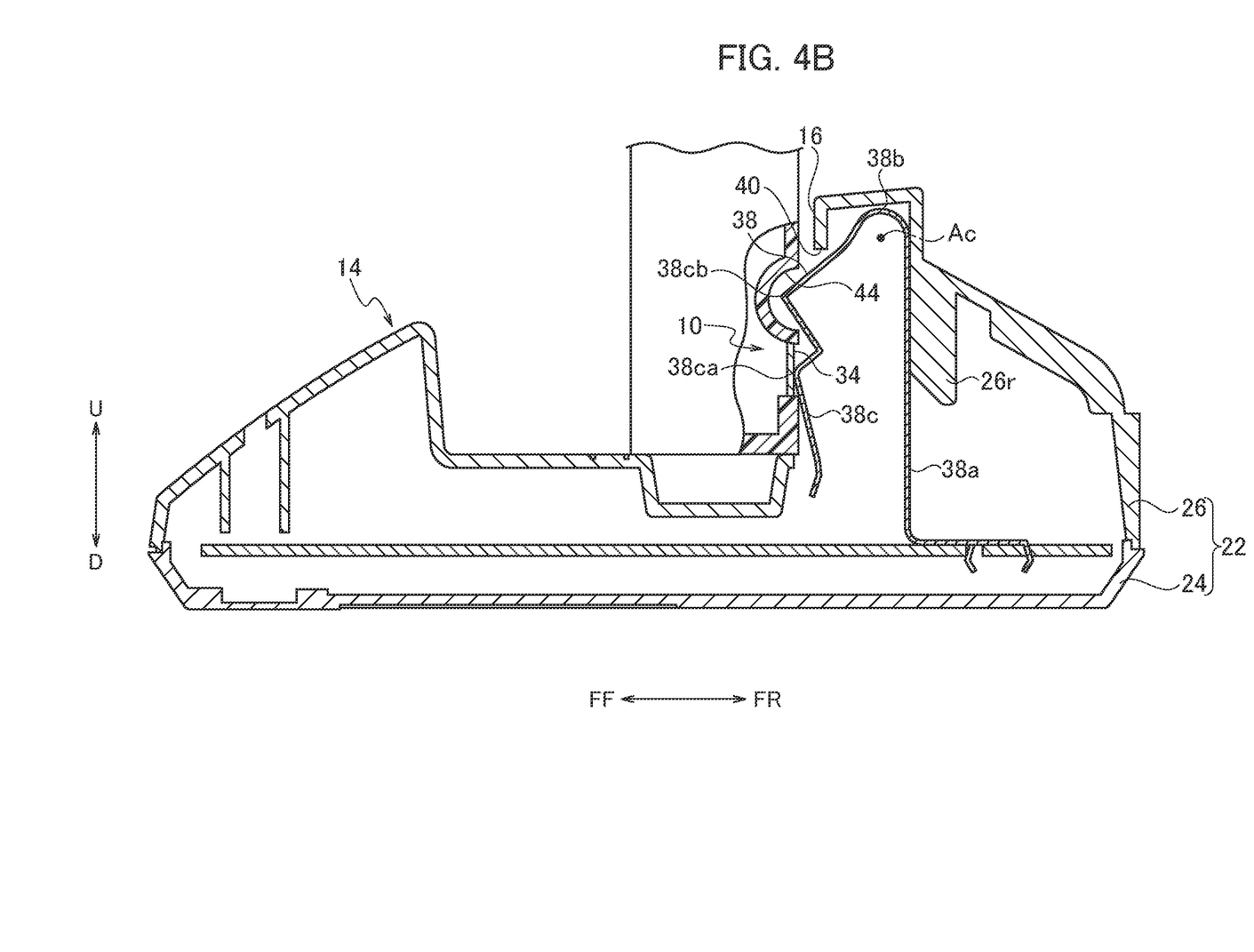
FIG. 4B is a cross-sectional view taken along line IVB-IVB in FIG. 3B while showing a part of an exterior of the battery.
Figure 5A:
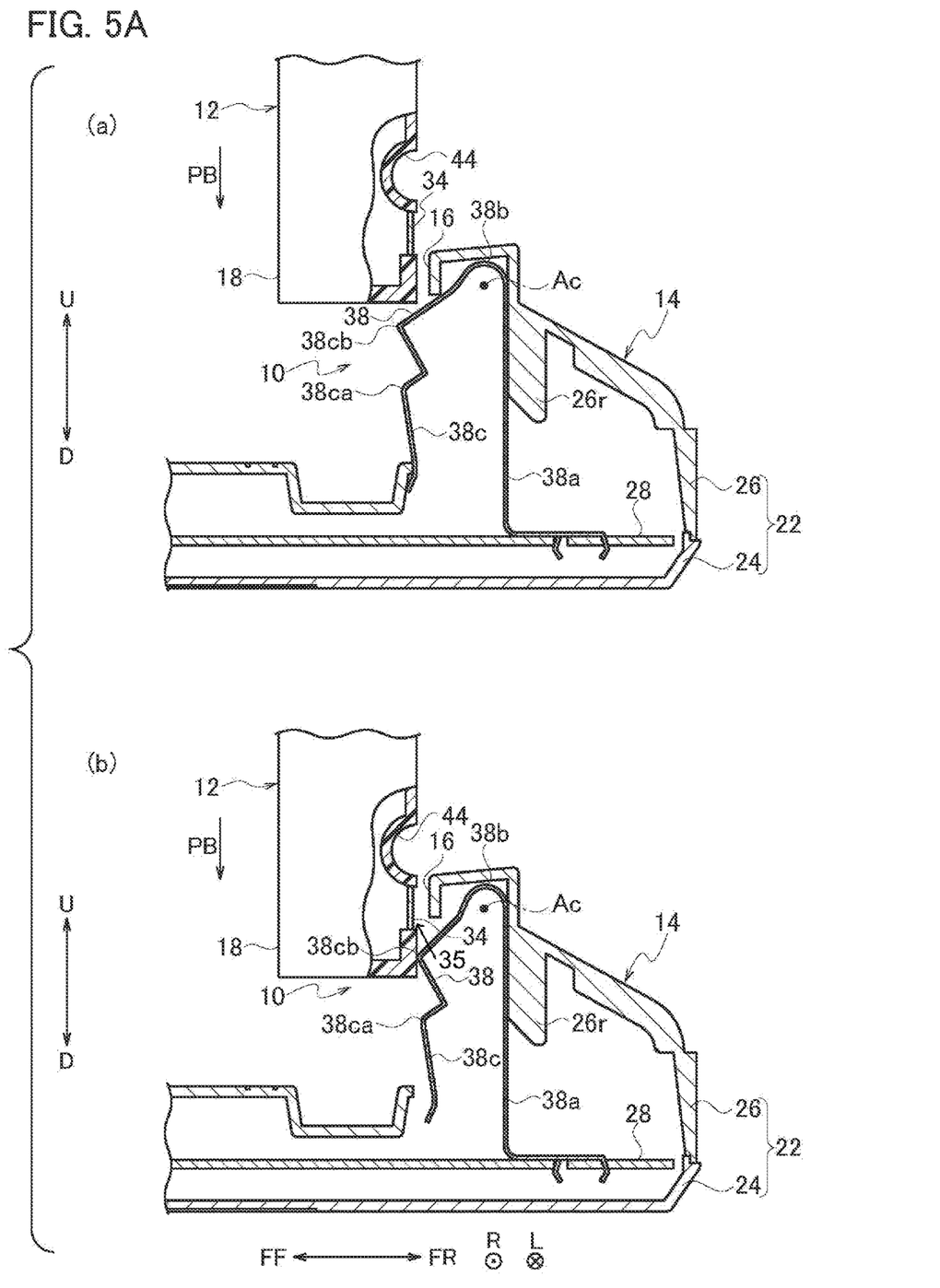
FIG. 5A is a cross-sectional view showing a state in which the battery is being fitted to the fitting part of the battery charger while showing a part of the exterior of the battery, FIG. 5A(a) showing a state before cleaning projections are brought into contact with a surface of an outer case of the battery, FIG. 5A(b) showing a state in which the cleaning projections are brought into contact with the surface of the outer case of the battery.

As illustrated in FIG. 4A and FIG. 4B, the charging terminals 38 are each a plate spring, including an upstand part 38a mounted on the circuit board 28, a bent part 38b integrally connected to the upper edge of the upstand part 38a, and a flap part 38c integrally connected to the bent part 38b. The upstand part 38a is in contact with a rib 26r of the cover case 26 with pressure. The flap part 38c is elastically deformable in the inward direction and the outward direction of the fitting part 16 about a deforming center Ac on the bent part 38b side. In a state before the battery 12 is fitted to the fitting part 16 of the battery charger 14, the lower end (the tip) of the flap part 38c is in contact with the bottom edge of the respective slots 40 with pressure. The respective charging terminals 38 may be a wire spring, instead of the plate spring.

The respective flap parts 38c include a contact projection 38ca to be electrically brought into contact with the respective battery terminals 34. The respective contact projections 38ca project into a V-like shape in the inward direction of the fitting part 16 of the battery charger 14. The flap parts 38c each include a cleaning projection 38cb to be brought into contact with the respective battery terminals 34 so as to clean the battery terminals 34 and the respective charging terminals 38. The respective cleaning projections 38cb are located closer to the opening side of the fitting part 16 of the battery charger 14 (separate from the bottom of the fitting part 16 more) than the respective contact projections 38ca, and project into a V-like shape in the inward direction of the fitting part 16 of the battery charger 14. In the state before the battery 12 is fitted to the fitting part 16 of the battery charger 14, the amount of projection of the respective cleaning projections 38cb is set to be greater than the amount of projection of the respective contact projections 38ca.

As illustrated in FIG. 2 and FIG. 4B, the battery outer case 18 is provided, adjacent to the battery terminals 34, with a recessed (groove-shaped) housing part 44 for housing the respective cleaning projections 38cb. The housing part 44 extends in the short-side direction of the battery 12. The battery outer case 18 may be provided with, instead of the single recessed housing part 44, a plurality of recessed housing parts (not illustrated) for independently housing the respective cleaning projections 38cb. The housing part 44 may have any stepped shape that can house the respective cleaning projections 38cb, instead of the recessed shape.

Figure 5B:
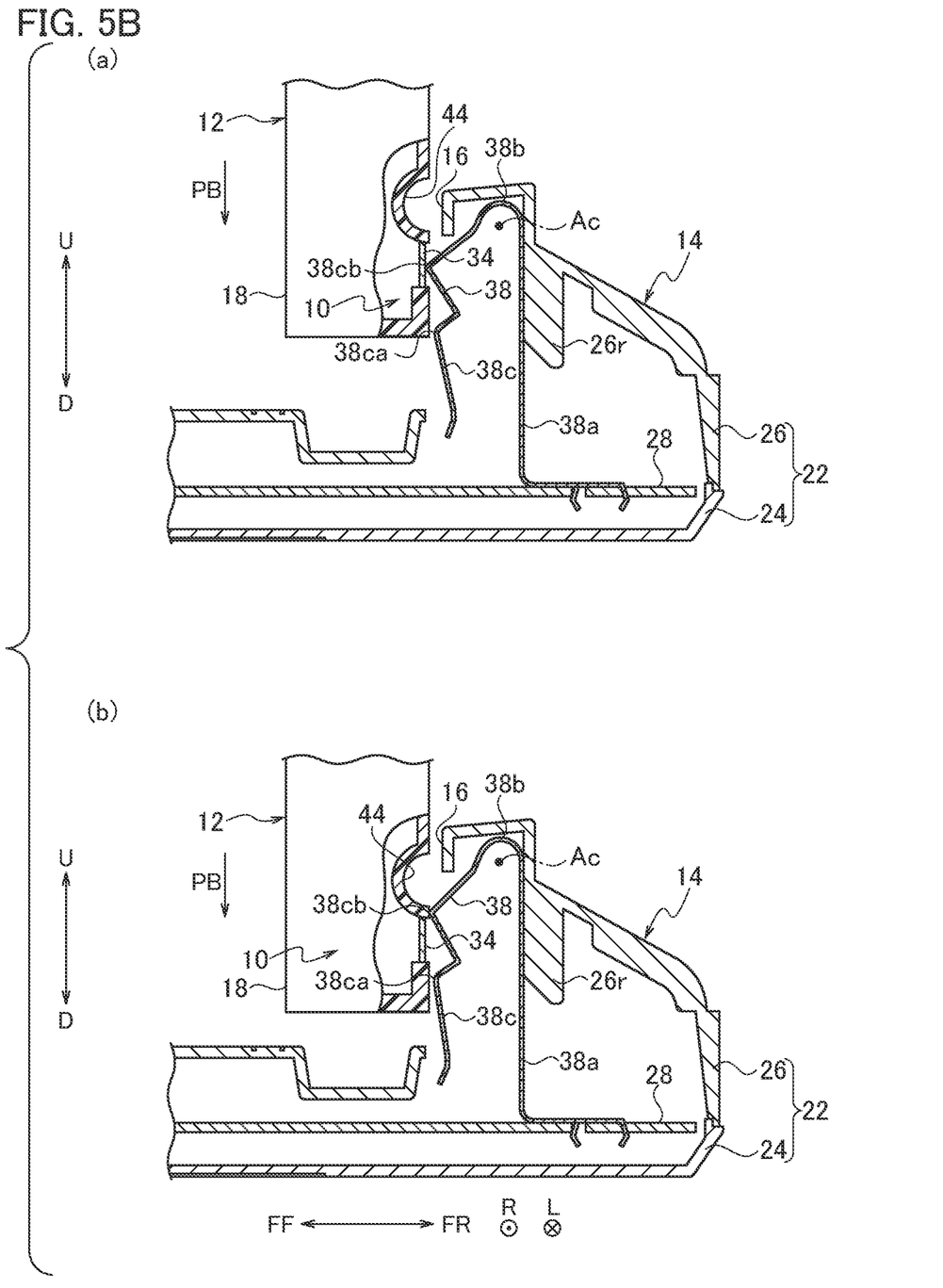
FIG. 5B is a cross-sectional view showing the state in which the battery is being fitted to the fitting part of the battery charger while showing a part of the exterior of the battery, FIG. 5B(a) showing a state in which the cleaning projections are brought into contact with surfaces of battery terminals, FIG. 5B(b) showing a state immediately before the cleaning projections are housed in a housing part of the battery.

As illustrated in FIG. 5A and FIG. 5B, the contact structure 10 is configured such that the cleaning projections 38cb are brought into contact with the surface of the battery outer case 18 in association with the movement of the battery 12 relative to the battery charger 14 in the fitting direction PB, so as to lead the contact projections 38ca to move in the outward direction of the fitting part 16 of the battery charger 14 against the elastic force of the respective flap parts 38c. The contact structure 10 is also configured such that, before the cleaning projections 38cb climb over the battery terminals 34 upon the movement of the battery 12 relative to the battery charger 14 in the fitting direction PB, the respective contact projections 38ca are not brought into contact with the surface of the battery outer case 18 or the surface of the respective battery terminals 34. Namely, the contact structure 10 is configured such that the respective contact projections 38ca are in the non-contact state of not being in contact with the surface of the battery outer case 18 or the surface of the respective battery terminals 34 in the state in which the respective cleaning projections 38cb are in contact with the surface of the battery outer case 18 or the surface of the respective battery terminals 34.

Figure 5C:
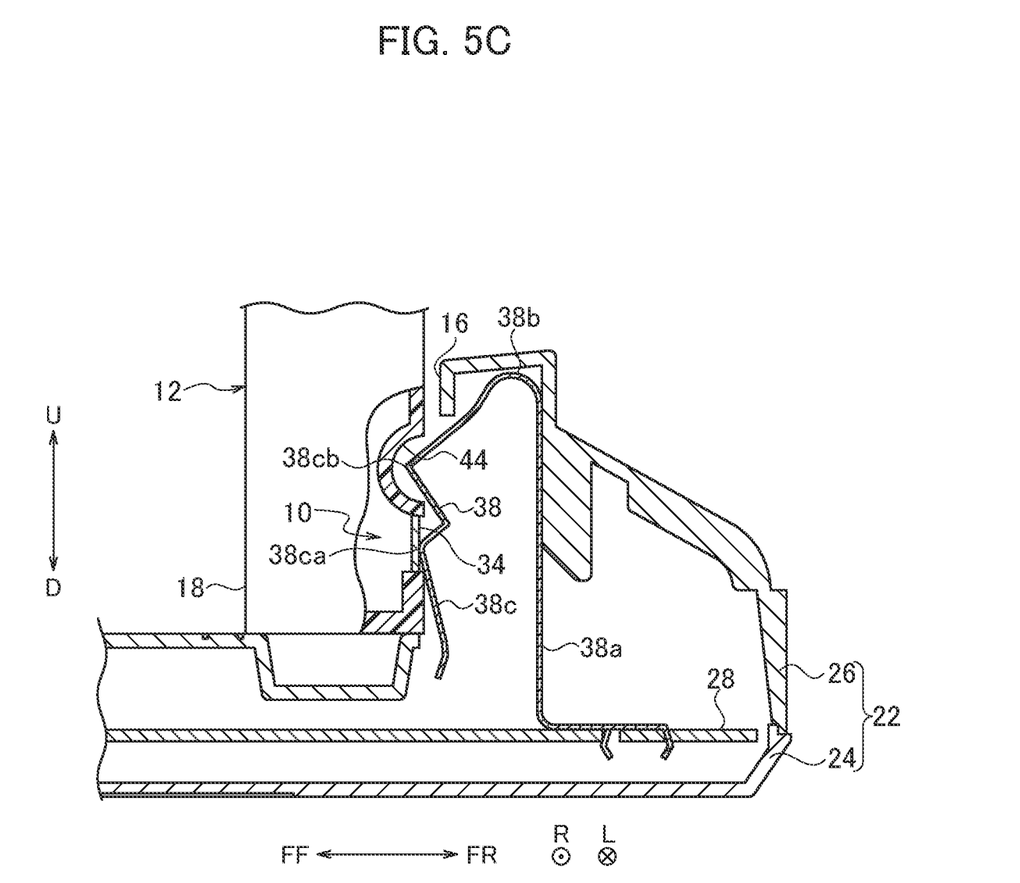
FIG. 5C is a cross-sectional view showing a state in which the battery is completely fitted to the fitting part of the battery charger while showing a part of the exterior of the battery.

As illustrated in FIG. 5B and FIG. 5C, the contact structure 10 is configured such that the cleaning projections 38cb climb over the battery terminals 34 to be housed in the housing part 44, so as to lead the contact projections 38ca to move in the inward direction of the fitting part 16 of the battery charger 14 by the elastic force of the flap parts 38c of the charging terminals 38 and to be brought into contact with the surface of the respective battery terminals 34. Namely, the contact structure 10 is configured such that the contact projections 38ca are brought into contact with the surface of the respective battery terminals 34 when the respective cleaning projections 38cb are shifted from the state of being in contact with the respective battery terminals 34 to the non-contact state in association with the movement of the battery 12 relative to the battery charger 14 in the fitting direction PB.

The functional effects according to one or more embodiments are described below.

As described above, the flap parts 38c of the charging terminals 38 include the cleaning projections 38cb for cleaning the respective battery terminals 34 and the respective charging terminals 38, in addition to the contact projections 38ca to be electrically connected to the battery terminals 34. The cleaning projections 38cb are located closer to the opening side of the fitting part 16 of the battery charger 14 than the contact projections 38ca. The rubbing between the cleaning projections 38cb of the charging terminals 38 and the surfaces of the battery terminals 34 before the contact between the contact projections 38ca of the charging terminals 38 and the surfaces of the battery terminals 34, can scrape out dirt such as stains or dust adhering to the surfaces of the battery terminals 34. This structure can reduce the dirt to be scraped by the rubbing between the contact projections 38ca of the charging terminals 38 and the surfaces of the battery terminals 34, so as to avoid or reduce a contact failure between the battery 12 and the battery charger 14 caused by the cleaning.

As described above, the contact structure 10 is configured such that the cleaning projections 38*cb* are brought into contact with the surface of the battery outer case 18 in association with the movement of the battery 12 relative to the battery charger 14 in the fitting direction PB, so as to lead the contact projections 38*ca* to move in the outward direction of the fitting part 16 of the battery charger 14. The contact structure 10 is also configured such that, before the cleaning projections 38*cb* climb over the battery terminals 34, the respective contact projections 38*ca* are not in contact with the surface of the battery outer case 18 or the surface of the respective battery terminals 34. The contact structure 10 is configured such that the cleaning projections 38*cb* climb over the battery terminals 34 to be housed in the housing part 44, so as to bring the contact projections 38*ca* into contact with the surfaces of the battery terminals 34. This structure enables the contact projections 38*ca* of the charging terminals 38 to be brought into contact with the surfaces of the battery terminals 34 with no contact with the surface of the battery outer case 18 of the battery 12. The contact structure 10 thus can avoid a contact failure between the battery 12 and the battery charger 14 caused by the contact between the contact projections 38*ca* of the charging terminals 38 and the battery outer case 18 of the battery 12.

One or more embodiments described above can greatly reduce a rate of occurrence of a contact failure between the battery 12 and the battery charger 14 accordingly.

The present disclosure can sufficiently reduce a rate of occurrence of a contact failure between the first electric device and the second electric device.

The present disclosure is not intended to be limited to one or more embodiments described above, and can be applied to various modes, such that the technical idea applied to the contact structure 10 described above is applied to another contact structure causing a first electric device other than the battery 12 to be electrically connected to a second electric device other than the battery charger 14. It should be understood that the scope of the present disclosure covers any contact structure for electrically connecting a first electric device other than the battery 12 with a second electric device other than the battery charger 14, in addition to the contact structure 10 for electrically connecting the battery 12 with the battery charger 14.

What is claimed is:

1. A system having a contact structure, wherein the system comprises a first electric device and a second electric device, wherein the contact structure causes the first electric device to be electrically connected to the second electric device in a state in which the first electric device is fitted to a recessed fitting part of the second electric device, the contact structure comprising:
   a first terminal provided at a position recessed from a surface of an outer case of the first electric device; and
   a second terminal configured to be a plate spring or a wire spring, the second terminal being provided on an inner wall of the fitting part of the second electric device to be brought into contact with a surface of the first terminal,
   the second terminal including a contact projection projecting in an inward direction of the fitting part of the second electric device to be electrically brought into contact with the surface of the first terminal, and a cleaning projection located closer to an opening side of the fitting part of the second electric device than the contact projection and projecting in the inward direction to be brought into contact with the first terminal,
   wherein before the cleaning projection climbs over the first terminal in response to a movement of the first electric device in a fitting direction relative to the second electric device, the cleaning projection is pushed in an outward direction of the fitting portion by the outer case of the first electric device or the first terminal so that the contact projection moves in the outward direction of the fitting part, whereby the contact projection is not brought into contact with the surface of the outer case of the first electric device or the surface of the first terminal, and
   wherein after the cleaning projection climbs over the first terminal, the cleaning projection is not pushed by the outer case of the first electric device or the first terminal so that the contact projection moves in the inward direction of the fitting part, whereby the contact projection is brought into contact with the surface of the first terminal.

2. A system having a contact structure, wherein the system comprises a first electric device and a second electric device, wherein the contact structure causes the first electric device to be electrically connected to the second electric device in a state in which the first electric device is fitted to a recessed fitting part of the second electric device, the contact structure comprising:
   a first terminal provided at a position recessed from a surface of an outer case of the first electric device; and
   a second terminal configured to be a plate spring or a wire spring, the second terminal being provided on an inner wall of the fitting part of the second electric device to be brought into contact with a surface of the first terminal,
   the second terminal including a contact projection projecting in an inward direction of the fitting part of the second electric device to be electrically brought into contact with the surface of the first terminal, and a cleaning projection located closer to an opening side of the fitting part of the second electric device than the contact projection and projecting in the inward direction to be brought into contact with the first terminal,
   wherein in a state in which the cleaning projection is in contact with either the surface of the outer case of the first electric device or the surface of the first terminal, the cleaning projection is pushed in an outward direction of the fitting portion by the outer case of the first electric device or the first terminal so that the contact projection moves in the outward direction of the fitting part, whereby the contact projection is not brought into contact with the surface of the outer case of the first electric device or the surface of the first terminal, and
   wherein when the cleaning projection is shifted from the contact state to a non-contact state in response to a movement of the first electric device in a fitting direction relative to the second electric device the cleaning projection is not pushed by the outer case of the first electric device or the first terminal, whereby the contact projection is brought into contact with the surface of the first terminal.

3. The system having a contact structure according to claim 1, wherein the contact structure is configured such that the contact projection moves in an outward direction of the fitting part of the second electric device when the cleaning projection is brought into contact with the surface of the outer case of the first electric device in response to the movement of the first electric device in the fitting direction relative to the second electric device, and configured such that the contact projection moves in the inward direction to be brought into contact with the surface of the first terminal when the cleaning projection climbs over the first terminal in response to the movement in the fitting direction of the first electric device relative to the second electric device.

4. The system having a contact structure according to claim 1, further comprising a housing part provided adjacent to the first terminal on the outer case of the first electric device to house the cleaning projection, the contact structure being configured such that the contact projection moves in the inward direction to be brought into contact with the surface of the first terminal when the cleaning projection climbs over the first terminal to be housed in the housing part in response to the movement in the fitting direction of the first electric device relative to the second electric device.

5. The system having a contact structure according to claim wherein a dimension of the cleaning projection is set to be greater than a dimension of the contact projection in a state before the first electric device is fitted to the fitting part of the second electric device.

\* \* \* \* \*

UNITED STATES PATENT AND TRADEMARK OFFICE
CERTIFICATE OF CORRECTION

PATENT NO. : 11,705,609 B2
APPLICATION NO. : 17/151521
DATED : July 18, 2023
INVENTOR(S) : Koji Chiba et al.

Page 1 of 1

It is certified that error appears in the above-identified patent and that said Letters Patent is hereby corrected as shown below:

In the Claims

Claim 5, Column 9, Line 17, please delete the phrase "according to claim wherein" and replace with "according to claim 1 wherein".

Signed and Sealed this
Twenty-ninth Day of August, 2023

Katherine Kelly Vidal
*Director of the United States Patent and Trademark Office*